July 10, 1973 H. FUCHS 3,745,113

BIOLOGICAL DECOMPOSITION OF ORGANIC MATERIAL

Filed March 25, 1971

Inventor

HUBERT FUCHS

By
Davis, Hoyle, Faithfull & Hapgood
Attorneys

United States Patent Office 3,745,113
Patented July 10, 1973

3,745,113
BIOLOGICAL DECOMPOSITION OF ORGANIC MATERIAL
Hubert Fuchs, Mayen, Germany, assignor to The De Laval Separator Company, Poughkeepsie, N.Y.
Filed Mar. 25, 1971, Ser. No. 128,097
Claims priority, application Sweden, Oct. 2, 1970, 13,372/70
Int. Cl. C02c 1/02
U.S. Cl. 210—12
10 Claims

ABSTRACT OF THE DISCLOSURE

An aqueous liquid with at least 1% by weight of organic material is maintained in rotation in a treatment vessel in the presence of thermophilic microorganisms including thermophilic bacteria, there being an elapsed time of 2 to 200 seconds for each revolution of the total vessel content. Air in the form of fine bubbles is supplied to the rotating liquid in a quantity ratio of one part by volume of air to 5 to 100 parts by volume of liquid during each revolution thereof, the liquid being heated without heat addition and by the activity of the thermophilic microorganisms to a temperature of at least 42° C. where the microorganisms are active. The revolving liquid is kept heat-insulated, preferably by foam formed in the biological decomposition; and preferably both the liquid and the foam are maintained in rotation in a vertical plane and in a direction such that they move outward from the center of the vessel at the region of their inter-contacting surfaces.

THE DISCLOSURE

Figure 1:
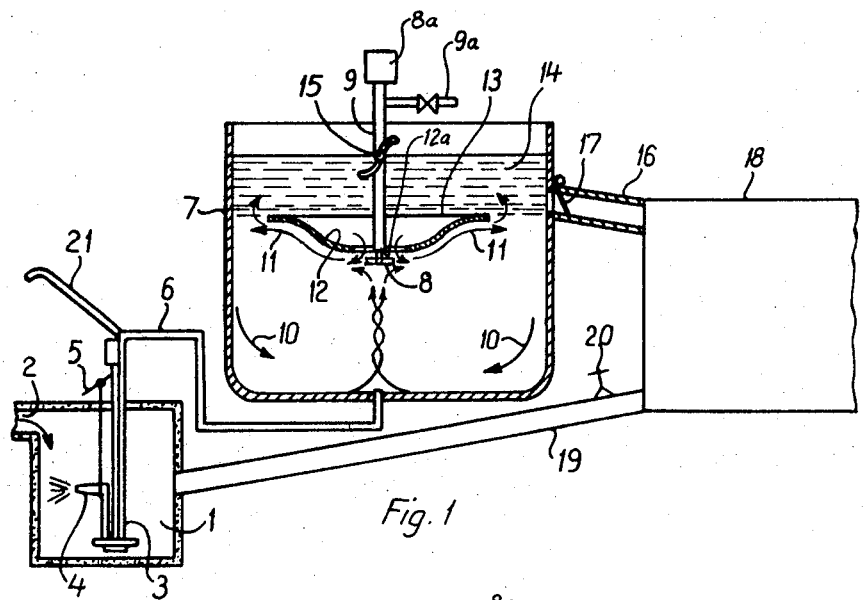

The present invention relates to a method for the biological decomposition of organic material by means of microorganisms.

In the common biological decomposition of materials such as sludge from municipal or industrial waste water or manure, while blowing in air but without temperature increase, the quantity of organic material is not reduced to the desired degree, and the decomposition residue to a large extent consists of a mass of bacteria. In addition, pathogenic bacteria and various kinds of virus, worm ova and weed seeds remain in this mass.

The present invention has for its principal object the provision of an improved method for biological decomposition.

According to the invention, an aqueous liquid is supplied to the treatment vessel with a percentage of organic material of at least 1% by weight and is kept in revolution in this vessel with a time of 2 to 200 seconds for each revolution of the total container content and in the presence of thermophilic microorganisms, especially thermophilic bacteria. Air is supplied to the liquid in the form of fine bubbles in such a quantity ratio that one part by volume of air is supplied to 5 to 100 parts by volume of liquid during each revolution of the liquid. The liquid is kept heat-insulated and, without heat addition, is heated by the activity of the thermophilic microorganisms to a temperature at which they are active (i.e., at least 42° C. and preferably 50 to 55° C.).

Experiments have shown that this method makes it possible to destroy, with the help of the thermophilic microorganisms, the pathogenic bacteria and various kinds of virus, worm ova and weed seeds and in addition decompose such materials as mineral oils, washing agents, hair and feathers. Furthermore, the quantity of organic material is reduced to a fraction of the starting quantity. This latter circumstance depends upon the oxidation of the organic material which takes place. Furthermore, the treated liquid is odorless and the decomposition process proper takes a time of only 6 to 10 days as compared with about 30 days in common methods used heretofore. The degree of utilization of the oxygen content of the supplied air is 70 to 100%. Thus, the oxygen percentage in the liquid during the decomposition treatment is advantageously kept at a value of only 0 to 0.5 mg. $O_2$/litre. The quantity of organic material of 1% by weight as a minimum in the liquid is necessary for providing the heat development to give the liquid a temperature of at least 42° C. A shorter time than 2 seconds per revolution causes too rapid a revolution, i.e., the microorganisms are broken to pieces and the liquid is cooled too intensely. If the revolution time is longer than 200 seconds, the microorganisms do not have the necessary access to oxygen, the process for this reason being characterized by lack of sufficient oxygen. The limit of 5 parts by volume of liquid to 1 part by volume of air is fixed to avoid too great an air excess, which would have such a cooling effect that the desired temperature of at least 42° C. is not reached. The limit of 100 parts by volume of liquid per part by volume of air is fixed so that the process will not be short of oxygen.

The revolution time and the quantity of liquid revolved per unit of time can be determined by measuring the flow velocity at different levels in the treatment vessel by means of conventional gauges.

At the start of the process, the heat development which is effected by the activity of the mesophilic microorganisms can be used for the heating of the liquid to the temperature where the thermophilic organisms are active. When the temperature rises substantially above 42° C., the activity of the mesophilic organisms decreases appreciably, and the heat development necessary in the continued process is then generated by the thermophilic organisms. If the liquid to be treated does not contain the microorganisms necessary for the process, the liquid can be inoculated with such organisms.

In those cases where a foam is developed by the liquid in the decomposition of its content of organic material, the foam can be allowed to form a heat insulation for the liquid surface. Since the foam layer has a tendency to increase in thickness, it is desirable to withdraw foam after the foam layer has reached a thickness of at least 10 cm.

A way of counteracting the increase of thickness of the foam layer is to bring the foam into revolution, whereby it is compressed and releases solids which sink into the liquid. This can be effected by means of a rotary knife working the foam. The revolution of the foam takes place to advantage in a vertical plane. Preferably, the revolution of the liquid also takes place in a vertical plane, the fine air bubbles introduced into the liquid having a tendency to rise and thereby acting to promote such revolution of the liquid.

Furthermore, it has proved suitable to bring the liquid and the foam into revolution in such a direction that the liquid and the foam at the region of their intercontacting surfaces move outward from the center of the vessel, since the sediment will then be drawn inward to the center of the vessel where a great flow velocity prevails. The sediment will then be kept suspended in the liquid, whereby the sediment can leave the vessel together with the liquid. The desired direction of movement of the foam in this case can be obtained by locating the aforesaid rotary knife at the center of the vessel.

Foam formed in the biological decomposition can be discharged from the vessel for separate use, such as the recovery of the protein content of the foam for feeding purposes.

Figure 2:
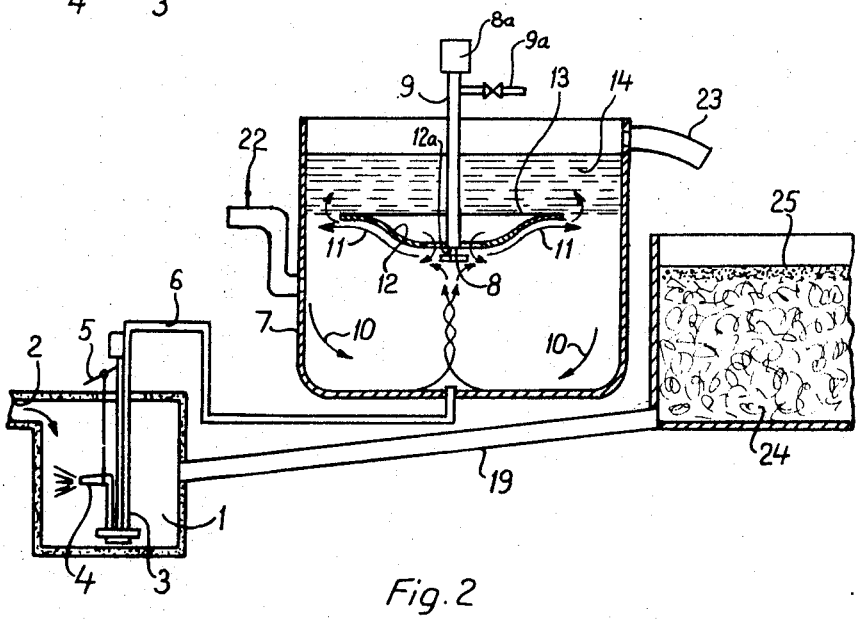

The invention is described more in detail in the following, reference being had to the accompanying drawing in which FIGS. 1 and 2 are schematic views of two different embodiments of a system for carrying out the present method.

In FIG. 1, a mixing container 1 for the liquid to be treated is provided with a liquid inlet 2. The liquid is well agitated by means of a pump 3 which sucks in liquid present in the container and ejects the same liquid through a nozzle 4, until a satisfactory agitation has been attained. Thereafter, the pump 3 is shifted by means of a lever 5 so as to pump liquid through a pipeline 6 to a vessel 7 for effecting biological decomposition of the liquid's content of organic material. The liquid in vessel 7 is assumed to contain the strains of microorganisms necessary for the treatment. The vessel 7 is provided with a device for effecting the revolution of the liquid and the air supply to the liquid and which can be of the same kind as that disclosed in my copending U.S. patent application Ser. No. 762,741 filed Sept. 26, 1968, and now U.S. Pat. 3,584,840. The device comprises a propeller 8, driven by a motor 8a, and an air supply tube 9 concentrically surrounding the propeller shaft. This tube receives air from a valved supply line 9a and opens just above the propeller, whereby the air supplied downward through the tube is dispersed by the propeller into small bubbles which accompanying the liquid in its revolving movements, as indicated by the arrows 10 and 11. The revolving movements are guided by a round bowl 12 with a central bottom hole 12a, below which the propeller 8 is provided. Above the liquid surface 13 there is a foam layer 14. A rotary knife 15, driven by a motor (not shown), is mounted on the tube 9 and tears asunder the foam in the center of the vessel and imparts to the foam a vertical rotary movement, clock-wise to the left of the tube 9 and counter-clockwise to the right of the tube. When pumping new liquid into the vessel 7 through the pipeline 6, a corresponding quantity of liquid together with foam discharges through an outlet 16, after a flap valve 17 inserted in this outlet has been opened. The discharged liquid and foam and accompanying sediment are collected in a large vat 18. A pipeline 19 with a shut-off valve 20 inserted therein extends from this vat to the container 1. On a suitable occasion, when the container 1 is emptied, the valve 20 is opened so that liquid flows from the vat 18 down into the container 1. From there, the liquid is pumped by the pump 3 to a tank car through a pipe 21, to which the pump outlet is now connected instead of to the pipeline 6 or nozzle 4.

In the system according to FIG. 2, the vessel 7 is provided with an overflow outlet pipe 22 for treated liquid and accompanying sediment. The foam which has been developed during the treatment discharges continuously through an overflow outlet 23 and is gathered on a filter bed 24. Solids accompanying the foam deposit on the upper side of the filter bed as a layer 25 when the foam sinks. Liquid formed by the foam flows through the pipeline 19 back to the container 1 and is thereafter subjected to a new treatment in the vessel 7. This embodiment is especially suitable when the liquid contains components of low specific gravity which are impossible to decompose, such as fibers in waste water from the paper pulp industry. These solids accompany the foam and can be recovered from the surface of the filter bed 24.

Examples (1) A container is filled with 45 m.$^3$ of pig's manure in an aqueous liquid having a percentage of organic material of 4% by weight, the liquid being maintained in revolution with a revolution time for the total content of 60 seconds. A seventh of the content is discharged each day and is compensated by an equally large refilling. 72 m.$^3$ of air are supplied per hour. The liquid temperature during the treatment time remains at about 50° C. Through this treatment, the content of organic material (including the quantity of thermophilic microorganisms) of the liquid is brought down to about 1.6% by weight. The liquid will then be free from odor and pathogenic bacteria, such as salmonella bacteria, various kinds of virus, worm ova and weed seeds.

(2) A container is filled with 20 m.$^3$ of sludge from a purification plant for municipal waste water. This sludge, which has a perectange of organic material of 6.5% by weight, is kept in revolution for 8 days with a revolution time for the total content of 40 seconds. No exchange of the container content is carried out during the treatment time. 72 m.$^3$ air are supplied per hour. The liquid temperature during the treatment time remains at 50 to 55° C. Through this treatment, the content of organic material (including the quantity of thermophilic microorganisms) of the liquid is brought down to about 1.5% by weight. The liquid will then be free from odor and pathogenic bacteria and various kinds of virus as well as worm ova. In contrast, it may be pointed out that in a usual putrefaction chamber in a purification plant, only 40% of the sludge is decomposed.

I claim:

1. A method for the biological decomposition of organic material by means of microorganisms, which comprises supplying to a treatment vessel an aqueous liquid with a perecentage of organic material of at least 1% by weight, mechanically agitating said liquid to maintain said liquid in revolution in the vessel with a time of 2 to 200 seconds for each revolution of the total vessel content and in the presence of thermophilic microorganisms including thermophilic bacteria, said agitating being effected independently of the air-supplying step hereinafter specified, supplying air in the form of fine bubbles to the revolving liquid in such a quantity ratio that one part by volume of air is supplied to 5 to 100 parts by volume of liquid during each revolution of the liquid, maintaining the revolving liquid heat-insulated, and heating the revolving liquid by the activity of the thermophilic microorganisms to a temperature of at least 42° C. where said microorganisms are active and in the absence of heat addition.

2. The method of claim 1, in which said heating is to a temperature of 50 to 55° C.

3. The method of claim 1, in which said heating is effected by the activity of mesophilic microorganisms.

4. The method of claim 1, in which a foam layer of at least 10 cm. thickness is maintained above the surface of the liquid in the vessel to maintain said liquid heat-insulated.

5. The method of claim 4, comprising also maintaining said foam layer in revolution.

6. The method of claim 4, comprising also maintaining said foam layer in revolution in a vertical plane.

7. The method of claim 1, in which said revolution of the liquid is maintained in a vertical plane.

8. The method of claim 4, in which said foam and liquid are maintained in revolution in a vertical plane and in such direction that the liquid and foam move outward from the center of the vessel at the region of the inter-contacting surfaces of the liquid and foam.

9. The method of claim 4, comprising also breaking said foam asunder, especially in the center of the vessel.

10. The method of claim 1, comprising also forming foam in the vessel incident to the biological decomposition, and discharging said foam from the vessel for separate use.

References Cited

UNITED STATES PATENTS

| 3,535,234 | 10/1970 | Gilwood | 210—12 X |
| 3,607,737 | 9/1971 | Gamer | 210—12 |
| 3,224,964 | 12/1965 | Derenk et al. | 210—13 X |
| 3,173,866 | 3/1965 | Lefton et al. | 210—13 X |

OTHER REFERENCES

Kambhu, K., et al., Aerobic Thermophilic Process, etc., Journal WPCF, vol. 41, May 1969, pp. R-127 thru R-141 (P.O.S.L.).

MICHAEL ROGERS, Primary Examiner

U.S. Cl. X.R.

210—13, 14, 15, 219, 221